(12) United States Patent
Lee et al.

(10) Patent No.: US 11,468,286 B2
(45) Date of Patent: Oct. 11, 2022

(54) PREDICTION GUIDED SEQUENTIAL DATA LEARNING METHOD

(71) Applicant: Leica Microsystems CMS GmbH, Wetzlar (DE)

(72) Inventors: Shih-Jong James Lee, Bellevue, WA (US); Hideki Sasaki, Bellevue, WA (US)

(73) Assignee: Leica Microsystems CMS GmbH, Wetzlar (DE)

( * ) Notice: Subject to any disclaimer, the term of this patent is extended or adjusted under 35 U.S.C. 154(b) by 920 days.

(21) Appl. No.: 15/609,000

(22) Filed: May 30, 2017

(65) Prior Publication Data

US 2018/0349766 A1 Dec. 6, 2018

(51) Int. Cl.
*G06N 3/04* (2006.01)
*G06N 3/08* (2006.01)
(Continued)

(52) U.S. Cl.
CPC ......... *G06N 3/0445* (2013.01); *G06N 3/0454* (2013.01); *G06N 3/084* (2013.01);
(Continued)

(58) Field of Classification Search
CPC .... G06N 3/0445; G06N 3/0454; G06N 3/084; G06N 20/20; G06N 20/10; G06N 5/003; G06N 20/00
(Continued)

(56) References Cited

U.S. PATENT DOCUMENTS 8,321,220 B1 * 11/2012 Chotimongkol ...... G10L 15/063
704/257
8,396,286 B1 * 3/2013 Aradhye ............ G06K 9/00718
382/159
(Continued)

OTHER PUBLICATIONS

Chen et al., "Ensemble Application of Convolutional and Recurrent Neural Networks for Multi-Label Text Categorization" May 14-19, 2017, International Joint Conference on Neural Networks, pp. 2377-2383. (Year: 2017).*
(Continued)

*Primary Examiner* — Miranda M Huang
*Assistant Examiner* — Chase P. Hinckley
(74) *Attorney, Agent, or Firm* — 2SPL Patent Attorneys PartG mbB; Yong Beom Hwang

(57) ABSTRACT

A computerized prediction guided learning method for classification of sequential data performs a prediction learning and a prediction guided learning by a computer program of a computerized machine learning tool. The prediction learning uses an input data sequence to generate an initial classifier. The prediction guided learning may be a semantic learning, an update learning, or an update and semantic learning. The prediction guided semantic learning uses the input data sequence, the initial classifier and semantic label data to generate an output classifier and a semantic classification. The prediction guided update learning uses the input data sequence, the initial classifier and label data to generate an output classifier and a data classification. The prediction guided update and semantic learning uses the input data sequence, the initial classifier and semantic and label data to generate an output classifier, a semantic classification and a data classification.

19 Claims, 2 Drawing Sheets

(51) Int. Cl.
  *G06N 5/00* (2006.01)
  *G06N 20/10* (2019.01)
  *G06N 20/20* (2019.01)
(52) U.S. Cl.
  CPC ............ *G06N 5/003* (2013.01); *G06N 20/10* (2019.01); *G06N 20/20* (2019.01)
(58) Field of Classification Search
  USPC ...................................................... 706/20, 12
  See application file for complete search history.

(56) References Cited

U.S. PATENT DOCUMENTS

| | | | | |
|---|---|---|---|---|
| 9,158,971 | B2* | 10/2015 | Gaidon | G06K 9/00711 |
| 9,772,994 | B2* | 9/2017 | Karov | G06F 40/211 |
| 9,858,261 | B2* | 1/2018 | Fan | G06F 40/211 |
| 9,881,380 | B2* | 1/2018 | Sorkine Hornung | G06K 9/00765 |
| 9,996,739 | B2* | 6/2018 | Wu | A61B 5/117 |
| 10,089,576 | B2* | 10/2018 | Gao | G06F 16/9535 |
| 10,133,728 | B2* | 11/2018 | Poon | G06F 40/30 |
| 10,169,647 | B2* | 1/2019 | Gur | G06N 20/10 |
| 10,255,269 | B2* | 4/2019 | Quirk | G06F 40/00 |
| 10,366,490 | B2* | 7/2019 | Xu | G06T 11/60 |
| 10,395,118 | B2* | 8/2019 | Yu | G06N 3/084 |
| 10,402,690 | B2* | 9/2019 | Vernaza | G06K 9/00791 |
| 10,448,888 | B2* | 10/2019 | McCarthy | A61B 5/4836 |
| 10,460,036 | B2* | 10/2019 | Duong | G06F 40/242 |
| 10,540,610 | B1* | 1/2020 | Yang | G06N 20/00 |
| 10,713,794 | B1* | 7/2020 | He | G06N 3/0454 |
| 10,817,509 | B2* | 10/2020 | Korpusik | G06F 16/284 |
| 10,839,284 | B2* | 11/2020 | Hashimoto | G06F 40/216 |
| 10,949,714 | B2* | 3/2021 | Gur | G06K 9/4628 |
| 10,997,724 | B2* | 5/2021 | Ravishankar | G06F 17/15 |
| 11,173,599 | B2* | 11/2021 | Levine | B25J 9/161 |
| 2009/0157571 | A1* | 6/2009 | Smith | G06K 9/6292 706/12 |
| 2014/0056511 | A1* | 2/2014 | Lu | G06K 9/4676 382/159 |
| 2015/0066496 | A1* | 3/2015 | Deoras | G10L 15/1815 704/232 |
| 2015/0309994 | A1* | 10/2015 | Liu | G06F 40/30 704/2 |
| 2016/0147943 | A1* | 5/2016 | Ash | G06N 7/005 705/3 |
| 2016/0162802 | A1* | 6/2016 | Chickering | G06N 20/00 706/12 |
| 2016/0217390 | A1* | 7/2016 | Shoaib | G06N 20/00 |
| 2016/0232455 | A1* | 8/2016 | Carus | G06N 7/005 |
| 2016/0239758 | A1* | 8/2016 | Jeong | G06N 20/00 |
| 2016/0350655 | A1* | 12/2016 | Weiss | G06F 40/35 |
| 2016/0371431 | A1* | 12/2016 | Haque | G16B 40/00 |
| 2017/0004205 | A1* | 1/2017 | Jain | G06N 5/022 |
| 2017/0011279 | A1* | 1/2017 | Soldevila | G06N 3/04 |
| 2017/0024642 | A1* | 1/2017 | Xiong | G06N 3/0454 |
| 2017/0039486 | A1* | 2/2017 | Simard | G06F 40/242 |
| 2017/0061330 | A1* | 3/2017 | Kurata | G06F 16/355 |
| 2017/0116521 | A1* | 4/2017 | Wang | G06N 3/04 |
| 2017/0235824 | A1* | 8/2017 | Liu | G06Q 40/00 707/723 |
| 2018/0082197 | A1* | 3/2018 | Aravamudan | G06N 5/04 |
| 2018/0114144 | A1* | 4/2018 | Miranda | G06F 40/30 |
| 2018/0129912 | A1* | 5/2018 | Vernaza | G06N 3/0454 |
| 2018/0165554 | A1* | 6/2018 | Zhang | G06K 9/6256 |
| 2018/0218253 | A1* | 8/2018 | Sen | G06N 20/10 |
| 2018/0218497 | A1* | 8/2018 | Golden | G06T 7/11 |
| 2018/0225281 | A1* | 8/2018 | Song | G06F 40/30 |
| 2018/0240031 | A1* | 8/2018 | Huszar | G06N 7/005 |
| 2018/0247194 | A1* | 8/2018 | Plebani | G06N 3/084 |
| 2018/0268023 | A1* | 9/2018 | Korpusik | G06F 40/30 |
| 2018/0285771 | A1* | 10/2018 | Lee | G06N 20/00 |
| 2018/0300317 | A1* | 10/2018 | Bradbury | G06F 40/216 |
| 2018/0300576 | A1* | 10/2018 | Dalyac | G06K 9/3241 |
| 2018/0315188 | A1* | 11/2018 | Tegzes | G06K 9/2054 |
| 2018/0330238 | A1* | 11/2018 | Luciw | G06N 3/0445 |
| 2018/0336183 | A1* | 11/2018 | Lee | G06F 40/30 |
| 2018/0341632 | A1* | 11/2018 | Akkiraju | G06F 16/35 |
| 2018/0367752 | A1* | 12/2018 | Donsbach | G06K 9/00221 |
| 2019/0026897 | A1* | 1/2019 | Wu | G06T 7/136 |
| 2019/0188212 | A1* | 6/2019 | Miller | G06F 16/285 |
| 2019/0205606 | A1* | 7/2019 | Zhou | G06N 3/0454 |
| 2019/0244348 | A1* | 8/2019 | Buckler | G06T 5/003 |
| 2019/0251366 | A1* | 8/2019 | Zhong | G06K 9/00771 |
| 2019/0258671 | A1* | 8/2019 | Bou | G06K 9/00751 |
| 2019/0332678 | A1* | 10/2019 | Ishida | G06F 40/216 |
| 2019/0370965 | A1* | 12/2019 | Lay | G06N 20/00 |
| 2020/0026283 | A1* | 1/2020 | Barnes | G06V 20/58 |
| 2020/0082198 | A1* | 3/2020 | Yao | G06N 3/0454 |
| 2020/0117856 | A1* | 4/2020 | Kumar Karn | G06F 40/295 |
| 2020/0118423 | A1* | 4/2020 | Moura | G08G 1/04 |
| 2021/0345947 | A1* | 11/2021 | McCarthy | A61B 5/112 |

OTHER PUBLICATIONS

Wang, Yan, "Three-Dimensional Object Search, Understanding, and Pose-Estimation with Low-Cost Sensors" 2015, Doctoral Dissertation, Columbia University, pp. i-153. (Year: 2015).*
Wang et al., "CNN-RNN: A Unified Framework for Multi-label Image Classification" 2016, pp. 2285-2294. (Year: 2016).*
Sharma et al., "Recursive Context Propagation Network for Semantic Scene Labeling" 2016, pp. 1-9. (Year: 2016).*
Dai et al., "Semi-Supervised Sequence Learning" 2015, pp. 1-9. (Year: 2015).*
Lou et al., "Structured Learning from Cheap Data" 2014, pp. 281-305. (Year: 2014).*
Guo et al., "Joint Semantic Utterance Classification and Slot Filling with Recursive Neural Networks" 2014, IEEE, pp. 554-559. (Year: 2014).*
Liu et al., "Representation Learning Using Multi-Task Deep Neural Networks for Semantic Classification and Information Retrieval" 2015. (Year: 2015).*
Li et al., "Large Scale Sequential Learning from Partially Labelled Data"2013, IEEE, pp. 176-183. (Year: 2013).*
Donahue et al., "Adversarial Feature Learning" Apr. 3, 2017, pp. 1-18. (Year: 2017).*
Liu et al., "Unsupervised Sequence Classification using Sequential Output Statistics" May 26, 2017, pp. 1-17. (Year: 2017).*
Hodapp, Chris "Unsupervised Learning for Computational Phenotyping" Dec. 29, 2016, pp. 1-6. (Year: 2016).*
Chiu et al., "EHR-based Phenotyping: Bulk Learning and Evaluation" Apr. 12, 2017, Journal of Biomedical Informatics, vol. 70: 35-51. (Year: 2017).*
Wang et al., "Unsupervised Category Discovery via Looped Deep Pseudo-Task Optimization Using a Large-Scale Radiology Image Database" Mar. 25, 2016. (Year: 2016).*
Gaidon et al., "Self-Learning Camera: Autonomous Adaptation of Object Detectors to Unlabeled Video Streams" Jun. 18, 2014, pp. 1-9. (Year: 2014).*
Saito et al., "Asymmetric Tri-training for Unsupervised Domain Adaptation" May 13, 2017. (Year: 2017).*
Suresh et al., "The Use of Autoencoders for Discovering Patient Phenotypes" Mar. 20, 2017, pp. 1-5. (Year: 2017).*
Pivovarov et al., "Learning Probabilistic Phenotypes from heterogeneous EHR data" Oct. 14, 2015, Journal of Biomedical Informatics, vol. 58: 156-165. (Year: 2015).*
Ye et al., "Self-learning Scene Specific Pedestrian Detectors using a Progressive Latent Model" Nov. 22, 2016. (Year: 2016).*
Singh et al., "Neighborhood Sensitive Mapping for Zero-Shot Classification using Independently Learned Semantic Embeddings" May 26, 2016. (Year: 2016).*
Okuma et al., "Self-Learning for Player Localization in Sports Video" Jul. 27, 2013. (Year: 2013).*
Souly et al., "Semi and Weakly Supervised Semantic Segmentation Using Generative Adversarial Network" Mar. 28, 2017. (Year: 2017).*

(56) References Cited

OTHER PUBLICATIONS

Raina et al., "Self-taught Learning: Transfer Learning from Unlabeled Data" 2007, Proceedings of the 24th International Conference on Machine Learning, pp. 759-766. (Year: 2007).*
Jowkar et al., "Perceptron Ensemble of graph-based positive-unlabeled learning for disease gene identification" Jul. 12, 2016, Computational Biology and Chemistry, vol. 64: 263-270. (Year: 2016).*
Ash et al., "Unsupervised Domain Adaptation Using Approximate Label Matching" Mar. 1, 2017. (Year: 2017).*
Dai et al., "Unsupervised High-Level Feature Learning by Ensemble Projection for Semi-Supervised Image Classification and Image Clustering" Feb. 4, 2016. (Year: 2016).*
Gao et al., "Deep Label Distribution Learning with Label Ambiguity" May 10, 2017, pp. 1-14. (Year: 2017).*
Uricchio et al., "Automatic Image Annotation via Label Transfer in the Semantic Space" Aug. 15, 2016, pp. 1-35. (Year: 2016).*
Csurka, Gabriela "Domain Adaptation for Visual Applications: A Comprehensive Survey" Feb. 17, 2017, pp. 1-46. (Year: 2017).*
Eyjolfsdottir et al., "Learning Recurrent Representations for Hierarchical Behavior Modeling" Nov. 15, 2016, pp. 1-12. (Year: 2016).*
Ye et al., "Self-learning Scene-specific Pedestrian Detectors using a Progressive Latent Model" Nov. 22, 2016, pp. 1-10. (Year: 2016).*
Ren et al., "CoType: Joint Extraction of Typed Entities and Relations with Knowledge Bases" Apr. 2017, pp. 1015-1024. (Year: 2017).*
Zhang et al., "Derivative Delay Embedding: Online Modeling of Streaming Time Series" Sep. 24, 2016, pp. 1-10. (Year: 2016).*
Yuan et al., "Incorporating Pre-Training in Long Short-Term Memory Networks for Tweets Classification" 2016, pp. 1329-1334. (Year: 2016).*
Islam et al., "Label Refinement Network for Coarse-to-Fine Semantic Segmentation" Mar. 1, 2017, pp. 1-9. (Year: 2017).*
Chen et al., "Syntax or Semantics? Knowledge-Guided Joint Semantic Frame Parsing" 2016, pp. 348-355. (Year: 2016).*
Li et al., "Weakly Supervised Object Localization with Progressive Domain Adaptation" 2016, pp. 3512-3520. (Year: 2016).*
Sterckx et al., "Knowledge Base Population using Semantic Label Propagation" Mar. 3, 2016, pp. 1-35. (Year: 2016).*
Lin et al., "RefineNet: Multi-Path Refinement Networks for High-Resolution Semantic Segmentation" Nov. 25, 2016. (Year: 2016).*
Gidaris et al., "Detect, Replace, Refine: Deep Structured Prediction for Pixel Wise Labeling" Dec. 4, 2016. (Year: 2016).*
Tang et al., "Multiple Instance Detection Network with Online Instance Classifier Refinement" Apr. 1, 2017. (Year: 2017).*
Niu et al., "FeaBoost: Joint Feature and Label Refinement for Semantic Segmentation" Feb. 12, 2017, pp. 1474-1480. (Year: 2017).*
Neverova et al., "Predicting Deeper into the Future of Semantic Segmentation" Mar. 28, 2017. (Year: 2017).*
Kocisky et al., "Semantic Parsing with Semi-Supervised Sequential Autoencoders" Nov. 2016, pp. 1078-1087. (Year: 2016).*
Sermanet et al., "Time-Contrastive Networks: Self-Supervised Learning from Multi-View Observation" Apr. 23, 2017, pp. 1-14. (Year: 2017).*
Bing et al., "Bootstrapping Distantly Supervised IE Using Joint Learning and Small Well-Structured Corpora" Feb. 12, 2017, pp. 3408-3414. (Year: 2017).*
Ishida et al., "Learning from Complementary Labels" May 22, 2017, pp. 1-11. (Year: 2017).*
Dumitrache et al., "Crowdsourcing Ground Truth for Medical Relation Extraction" Jan. 9, 2017, pp. 1-18. (Year: 2017).*
Sun et al., "Large-scale Relation Extraction with Distantly Supervised Neural Network" Apr. 2017, pp. 1033-1043, (Year: 2017).*
Zhou et al., "Modelling Sentence Pairs with Tree-structured Attentive Encoder" Oct. 10, 2016. (Year: 2016).*
Chen et al., "Weakly-Supervised Deep Self-Learning for Face Recognition" Jul. 11, 2016. (Year: 2016).*
Cai et al., "Bidirectional Recurrent Convolutional Neural Network for Relation Classification" Aug. 2016, pp. 756-765. (Year: 2016).*
Dong et Lapata, "Language to Logical Form with Neural Attention" Jun. 6, 2016, pp. 1-11. (Year: 2016).*
Zhang, Yuan, "Transfer Learning for Low-resource Natural Language Analysis" Feb. 2017, pp. i-142. (Year: 2017).*
Eriguchi et al., "Learning to Parse and Translate Improves Neural Machine Translation" Apr. 23, 2017, pp. 1-7. (Year: 2017).*
Nguyen et al., "A Novel Neural Network Model for Joint POS Tagging and Graph-Based Dependency Parsing" May 16, 2017. (Year: 2017).*
Guo et Chao, "Building an End-to-End Spatial-Temporal Convolutional Network for Video Super-Resolution" Feb. 2017, pp. 4053-4060. (Year: 2017).*
Quirk et Poon, "Distant Supervision for Relation Extraction beyond the Sentence Boundary" Sep. 30, 2016. (Year: 2016).*
Luo et al., "Learning with Noise: Enhance Distantly Supervised Relation Extraction with Dynamic Transition Matrix" May 11, 2017, pp. 1-10. (Year: 2017).*
Zhang et al., "Deep Reinforcement Learning for Visual Object Tracking in Videos" Apr. 10, 2017. (Year: 2017).*
Miyazaki et Komachi, "Japanese Sentiment Classification using a Tree-Structured Long Short-Term Memory with Attention" Apr. 4, 2017. (Year: 2017).*
Ji et al., "Distant Supervision for Relation Extraction with Sentence-Level Attention and Entity Descriptions" Feb. 2017, pp. 3060-3066. (Year: 2017).*
Misra et Artzi, "Neural Shift-Reduce CCG Semantic Parsing" Nov. 2016, pp. 1775-1786. (Year: 2016).*
Miwa et Bansal, "End-to-End Relation Extraction using LSTMs on Sequences and Tree Structures" Jun. 8, 2016. (Year: 2016).*
Roth, Dan, "Incidental Supervision: Moving Beyond Supervised Learning" Feb. 2017, pp. 4886-4890. (Year: 2017).*
Xiang et al., "Distant Supervision for Relation Extraction with Ranking-Based Methods" May 24, 2016, pp. 1-16. (Year: 2016).*
Xing et al., "Topic-Aware Neural Response Generation" Feb. 2017, pp. 3351-3357. (Year: 2017).*
Zeng et al., "Distant Supervision for Relation Extraction via Piecewise Convolutional Neural Networks" Sep. 2015, pp. 1753-1762. (Year: 2015).*
Brarda et al., "Sequential Attention" May 5, 2017. (Year: 2017).*
Dozat et Manning, "Deep Biaffine Attention for Neural Dependency Parsing" Mar. 10, 2017, pp. 1-8. (Year: 2017).*
Han et Sun, "Distant Supervision via Prototype-Based Global Representation Learning" Feb. 2017, pp. 3443-3449. (Year: 2017).*
Kong et al., "DRAGNN: A Transition-Based Framework for Dynamically Connected Neural Networks" Mar. 13, 2017. (Year: 2017).*
Liang et Zhang, "AC-BLSTM: Asymmetric Convolutional Bidirectional LSTM Networks for Text Classification" Dec. 15, 2016, pp. 1-7. (Year: 2016).*
Liu et al., "Bidirectional-Convolutional LSTM Based Spectral-Spatial Feature Learning for Hyperspectral Image Classification" May 23, 2017, pp. 1-18. (Year: 2017).*
Peters et al., "Semi-supervised sequence tagging with bidirectional language models" Apr. 29, 2017. (Year: 2017).*
Plank et al., "Multi-lingual Part-of-Speech Tagging with Bidirectional Long Short-Term Memory Models and Auxiliary Loss" Jul. 21, 2016. (Year: 2016).*
Marcheggianni et al., "A Simply and Accurate Syntax-Agnostic Neural Model for Dependency-based Semantic Role Labeling" Jan. 10, 2017. (Year: 2017).*
Lea et al., "Temporal Convolutional Networks for Action Segmentation and Detection" Nov. 16, 2016. (Year: 2016).*
Chakraborty et Namboodiri, "Learning to Estimate Pose by Watching Videos" Apr. 13, 2017, arXiv: 1704.04081v1, pp. 1-11. (Year: 2017).*
Shelhamer et al., "Loss is its own Reward: Self-Supervision for Reinforcement Learning" Mar. 9, 2017, arXiv: 1612.07307v2, pp. 1-9. (Year: 2017).*
Vijayanarasimhan et al., "SfM-Net: Learning of Structure and Motion from Video" Apr. 25, 2017, arXiv: 1704.07804v1, pp. 1-9. (Year: 2017).*

(56) References Cited

OTHER PUBLICATIONS

Pathak et al., "Curiosity-driven Exploration by Self-Supervised Prediction" May 15, 2017, arXiv: 1705.05363v1, pp. 1-12. (Year: 2017).*
Yang et al., "Enhancing Person Re-identification in a Self-trained Subspace" Apr. 30, 2017, arXiv: 1704.06020v2, pp. 1-14. (Year: 2017).*
Mahmoudieh, Parsa, "Self-Supervision for Reinforcement Learning" May 11, 2017, pp. 1-12. (Year: 2017).*
Mostajabi et al., "Diverse Sampling for Self-Supervised Learning of Semantic Segmentation" Dec. 6, 2016, arXiv: 1612.01991v1. (Year: 2016).*
Belagiannis et Zissmerna, "Recurrent Human Pose Estimation" Feb. 25, 2017. (Year: 2017).*
Bansal et al., "PixelNet: Representation of the pixels, by the pixels, and for the pixels" Feb. 21, 2017. (Year: 2017).*

* cited by examiner

PREDICTION GUIDED SEQUENTIAL DATA LEARNING METHOD

STATEMENT AS TO RIGHTS TO INVENTIONS MADE UNDER FEDERALLY SPONSORED RESEARCH AND DEVELOPMENT

This work was supported by U.S. Government grant number 1R44NS097094-01A1, awarded by the NATIONAL INSTITUTE OF NEUROLOGICAL DISORDERS AND STROKE and U.S. Government grant number 5R43MH100780-02, awarded by the NATIONAL INSTITUTE OF MENTAL HEALTH. The U.S. Government may have certain rights in the invention.

BACKGROUND OF THE INVENTION

Field of the Invention

The present invention relates to machine learning and more particularly to a prediction guided sequential data learning method including semantic learning, update learning, and update and semantic learning.

Description of the Related Art a. Description of Problem that Motivated Invention.

Machine learning, especially deep learning, powered by the tremendous computational advancement in graphics processing units (GPUs) and the availability of big data, has gained significant attention and is being applied to many new fields and applications. It can support end-to-end learning and learn hierarchical feature representation automatically. It is highly scalable and can achieve better prediction accuracy with more data. To handle large variations and dynamics inherent in sequential data, high capacity model is often required. It could be incredibly effective when trained with high capacity models ($>10^8$ parameters).

However, high capacity models require the training of huge labeled (annotated) datasets to avoid over-fitting. For example, the image database ImageNet contains 1.2 million images with 1000 categories for deep network training. In this highly connected mobile and cloud computing era, big datasets are becoming readily available. Therefore, the bottleneck is in acquiring the labels rather than the data. The situation is exacerbated with the ever increasing size of big databases.

b. How did Prior Art Solve Problem?

Prior art approaches use crowdsourcing such as AMT (Amazon Mechanical Turk) to get large training sets by having large numbers of people hand-label lots of data. There are also video games such as "Mozak", "EVE Online: Project Discovery" designed to crowdsource the creation of labels by the game players. These approaches could be expensive and are hard to scale and the labeling quality is poor.

Because of the deficiencies of the prior art approaches, improved methods of machine learning, particularly for classifying sequential data, are urgently needed.

BRIEF SUMMARY OF THE INVENTION

The primary objective of this invention is to provide a computerized prediction guided sequential data learning method for efficient initial learning without labeling data and accurate semantic classification with a small number of labeled training data. The secondary objective of the invention is to provide a computerized prediction guided sequential data learning method for efficient initial learning without labeling data and update learning with a small number of labeled data for accurate data classification. The third objective of the invention is to provide a computerized prediction guided sequential data learning method for efficient initial learning without labeling data and semantic and update learning with a small number of labeled data for accurate semantic and data classification. The fourth objective of this invention is to provide a computerized self-supervised learning method to learn the rich internal representation for the sequential data without labeled data.

The current invention provides prediction guidance by self-supervised learning for sequential data. It first learns by inputting a stream of unlabelled data sequence and tries to predict a future input from the current and past inputs to generate an initial classifier. Since future inputs are also available in the data sequence, they can serve as labeled training data without explicit labeling. By learning to predict on a large amount of self-supervised data, the initial classifier creates a rich internal representation of high-order kinetic phenotypes to predict future inputs.

Afterwards, we can solve a specific classification task by prediction guided update learning. This is done by taking the learned feature representation embedded in the initial classifier and a small amount of labeled data for the targeted classification task, and apply supervised learning on that labeled data to solve the targeted classification task.

In brief, the methods according to the present invention includes a prediction learning, followed by a prediction guided learning, which may be semantic learning, update learning or update and semantic learning.

DETAILED DESCRIPTION OF THE PREFERRED EMBODIMENTS

The concepts and the preferred embodiments of the present invention will be described in detail below in conjunction with the accompanying drawings.

I. Application Scenarios

Figure 1:
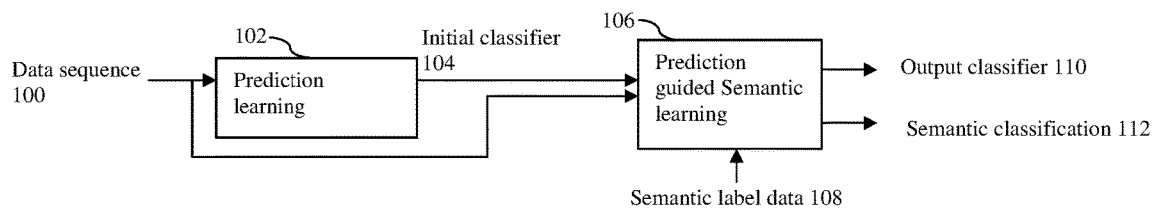
FIG. 1 shows the processing flow of one embodiment of the prediction guided sequential data learning method according to the present invention.

FIG. 1 shows the processing flow of one embodiment of the prediction guided sequential data learning method according to the present invention. A data sequence 100 is inputted to the memory of a computer hosting a computerized machine learning tool. A prediction learning module 102 processes the data sequence 100 by a computer program of the computerized machine learning tool to generate an initial classifier 104. The prediction learning is performed without explicitly labeled data. A semantic label data 108 is inputted into the computer memory. The semantic label data 108 associates a subset of data sequence 100 with their semantic labels or it could be a new set of labeled data. A prediction guided semantic learning module 106 uses the data sequence 100, the initial classifier 104 and the semantic label data 108 to generate an output classifier 110 and semantic classification 112 for the data sequence 100. After learning, the output classifier 110 can be applied to new data sequences.

Figure 2:
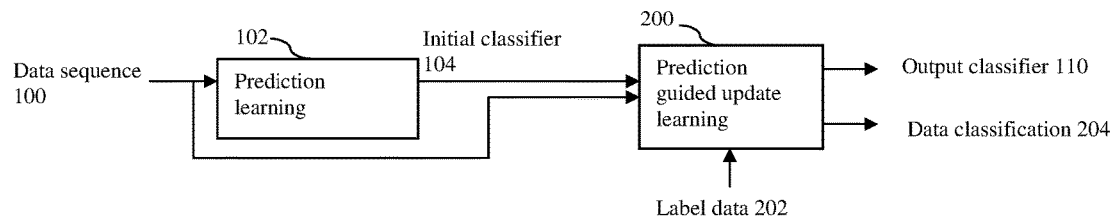
FIG. 2 shows the processing flow of an alternative embodiment of the prediction guided sequential data learning module.

FIG. 2 shows the processing flow of an alternative embodiment of the prediction guided sequential data learning method. A data sequence 100 is inputted to the memory of a computer hosting a computerized machine learning tool. A prediction learning module 102 processes the data sequence 100 by a computer program of the computerized machine learning tool to generate an initial classifier 104. The prediction learning is performed without explicitly labeled data. A label data 202 is inputted into the computer memory. The label data 202 associates a subset of data sequence 100 with their truth labels. Additional data with labels could also be included. A prediction guided update learning module 200 uses the data sequence 100, the initial classifier 104 and the label data 202 to generate an output classifier 110 and a data classification 204 for the data sequence 100. After learning, the output classifier 110 can be applied to new data sequences.

Figure 3:
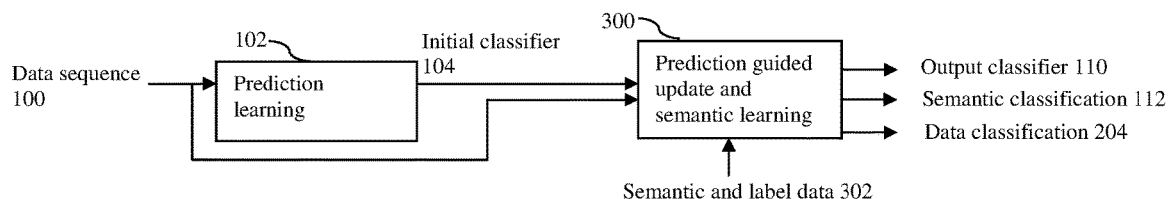
FIG. 3 shows the processing flow of yet another embodiment of the prediction guided sequential data learning module.

FIG. 3 shows the processing flow of a third embodiment of the prediction guided sequential data learning method. A data sequence 100 is inputted to the memory of a computer hosting a computerized machine learning tool. A prediction learning module 102 processes the data sequence 100 by a computer program of the computerized machine learning tool to generate an initial classifier 104. The prediction learning is performed without explicitly labeled data. A semantic and label data 302 is inputted into the computer memory. The semantic and label data 302 associates a subset of data sequence 100 with their semantic labels and can include additional labeled data. A prediction guided update and semantic learning module 300 uses the data sequence 100, the initial classifier 104 and the semantic and label data 302 to generate an output classifier 110, a semantic classification 112 and a data classification 204 for the data sequence 100. After learning, the output classifier 110 can be applied to new data sequences.

II. Data Sequence

The data sequence 100 consists of data ordered in a sequential fashion such as the information from languages, music, genomes, videos, plane slices of 3D images, etc. The essential property of the data sequence 100 is that data is ordered.

III. Semantic Labels

The semantic labels in the semantic label data 108 define the semantic meaning of the data sequence 100. They can be cellular states and/or phenotypic regions of interest in a data sequence consisting of time-lapse cellular images. The semantic labels can also be objects of interest in a data sequence consisting of video clips. A person having ordinary skill in the art should recognize that other semantic labels such as the words contained in a speech clips or gene labels of a DNA sequence. They are within the scope of the current invention.

IV. Prediction Learning

Figure 4:
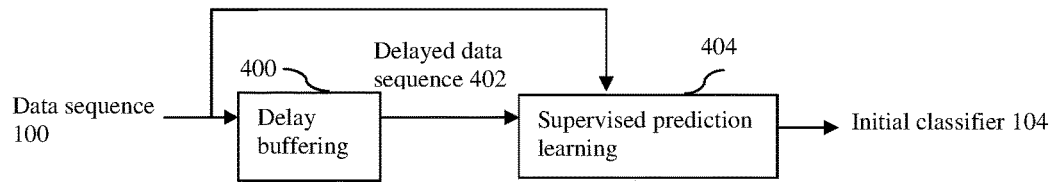
FIG. 4 shows the processing flow of one embodiment of the prediction learning module.

FIG. 4 shows the processing flow of one embodiment of the prediction learning module 102. As shown in FIG. 4, the prediction learning module 102 performs a delay buffering 400 of the data sequence 100 to generate a delayed data sequence 402 which delays the data sequence 100 by an amount (for example D cycles) that is defined manually or automatically depending on the application scenarios underlying the data sequence 100. The delayed data sequence 402 and the data sequence 100 are processed by a supervised prediction learning module 404 to generate the initial classifier 104. The supervised prediction learning module 404 uses delayed data sequence 402 as the input to predict the input data sequence 100 which is effectively D cycles ahead of the delayed data sequence 402. The supervised prediction learning module 404 uses data sequence from sequence index (or cycle) 1 to i-D for learning to predict the data sequence from i-D+1 to i, where i is the index for the current cycle of the data sequence 100. The data at the sequences i-D+1 to i are available from the data sequence 100 and are used directly as the truth data for the supervised prediction learning without the data labeling (annotation). Therefore a large number of training data can be made available through the prediction learning method of the current invention to sufficiently train the initial classifier.

By learning to predict a large amount of data through self-supervision, the initial classifier 104 could create a rich internal representation of high-order models for the sequential data 100. Note that the prediction of future inputs may not have practical value as we will have them from input data. But it is used to force the classifiers such as deep network to learn to model the rich high-order application domain models.

In one embodiment of the invention, the supervised prediction learning 404 is implemented by a deep network. In another embodiment of the invention, the supervised prediction learning is implemented by a recurrent network. In yet a third embodiment of the invention, the supervised prediction learning is implemented by traditional machine learning methods.

These three implementations for the supervised prediction learning 404 are separately discussed below.

A. Deep Network

Deep network is rooted at artificial neural network facilitated by tremendous computational advancement (GPUs) and the availability of big data. The recent trend in deep layers of convolutional neural networks has dramatically changed the landscape in machine learning and pattern recognition. It uses a cascade of many layers of nonlinear processing units for feature extraction and transformation. Each successive layer uses the output from the previous layer as input. It learns multiple levels of features or representations of the data. Higher level features are derived from lower level features to form a hierarchical representation. It can be effectively scaled up to high capacity models. The traditional machine learning method is only partially trainable. They require hand-designed feature extraction followed by trainable classifier operating on hand-designed features. In contrast, the deep networks allow the learning of hierarchical feature representation automatically as well as the classifier.

Figure 5:
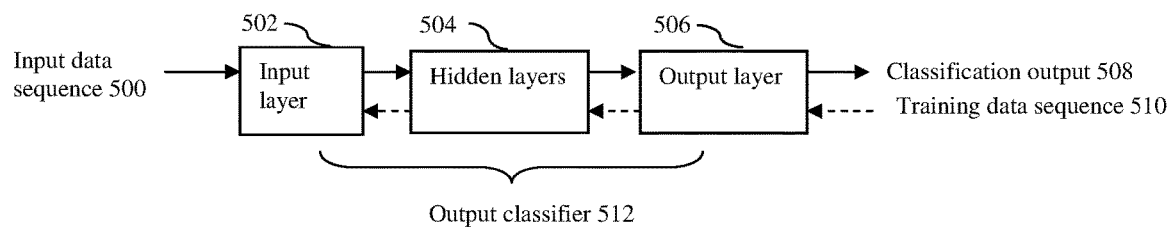
FIG. 5 shows the processing flow of one embodiment of the supervised prediction learning module implemented as a deep network.

FIG. 5 shows the processing flow of an embodiment of the supervised prediction learning module 404 implemented as a deep network. The input data sequence 500 (corresponding to delayed data sequence 402) is processed by at least one input layer 502, followed by a plurality of hidden layers 504 and then the output layer 506. In the training phase, the training data sequence 510 (corresponding to data sequence 100 in FIG. 4) is backpropagated from the output layer back to the hidden layers and then input layer to update their weights (see the dashed lines for the training flow). After training, the output classifier 512 (corresponding to initial classifier 104 in FIG. 4) contains the complete deep network architecture and their parameters (weights). In the classification phase, the input data sequence 500 is processed in a feed-forward fashion to generate the classification output 508.

In addition to pattern classification, the deep network can also perform semantic segmentation. For example, in image data, the semantic segmentation provides per pixel labeling. To perform semantic segmentation, fully convolutional network can be used. These networks yield a coarse segmentation map for any given data, and it is followed by upsampling within the network to get dense predictions. This method enables an end-to-end training for the task of semantic segmentation of data. Typical fully convolutional networks include U-Net, deconvolution networks, SegNet, Dilated convolution network, Sharpmask and DeepLab, etc.

B. Recurrent Network

The conventional deep network such as Convolutional Neural Networks (CNN) are not designed to handle sequential data. The simplest way to include sequential data in CNN is to concatenate multiple cycles and feed it as a single input. Small variations of this method are used for context classification on one million youtube videos. However, it could not improve on single frame prediction by much which can indicate the inefficiency of this approach.

To handle sequential data, in another embodiment of the invention, recurrent network is used. Recurrent networks take as their input not just the current input data, but also the information extracted from previous cycles. Because the layers and cycles of deep networks relate to each other through multiplication, derivatives are susceptible to vanishing or exploding. The vanishing gradient problem emerged as a major obstacle to recurrent network performance. This problem is solved by a recurrent unit 600 such as Long Short-Term Memory Units (LSTMs).

LSTMs contain information outside the normal flow of the recurrent network in a gated cell. Information can be stored in, written to, or read from a cell, much like data in a computer's memory. The cell makes decisions about what to store, and when to allow reads, writes and erasures, via gates that open and close. Unlike the digital storage on computers, however, these gates are analog, implemented with element-wise multiplication by sigmoids, which are all in the range of 0-1. Analog has the advantage over digital of being differentiable, and therefore suitable for backpropagation.

Figure 6:
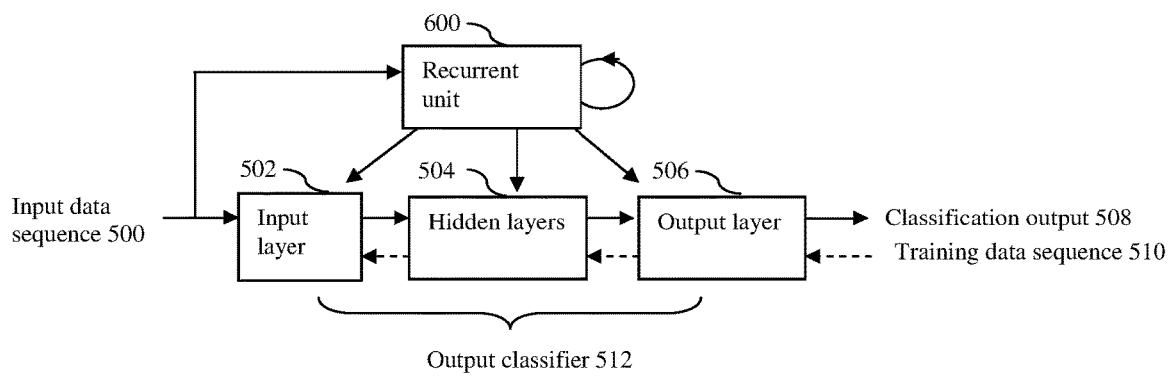
FIG. 6 shows the processing flow of an embodiment of the supervised prediction learning module implemented as a recurrent network.

FIG. 6 shows the processing flow of an embodiment of the supervised prediction learning module 404 implemented as a recurrent network containing a recurrent unit 600. The input to the recurrent unit includes the current data and previous cycle recurrent unit output, etc. The recurrent unit can be a LSTM or its variations such as Convolutional LSTM (CLSTM) and Bi-Directional Convolutional LSTM (BDC-LSTM). A person having ordinary skill in the art should recognize that other recurrent units such as Gated Recurrent Units (GRU) can be used. They are within the scope of the current invention.

C. Traditional Machine Learning Methods

Even though the traditional machine learning methods require hand-designed features, they can also be trained to predict future data. For prediction guidance, the prediction training can be performed to select good features from sample prediction training data set. The selected features can then be used for the next stage prediction guided learning.

The traditional machine learning methods that could be used include decision tree classifier, random forest classifier, support vector machine, kernel estimator, mixture of Gaussian classifier, nearest neighbor classifier, etc. A person having ordinary skill in the art should recognize that other traditional machine learning methods such as naive Bayes classifier, maximum likelihood classifier, Bayes linear and quadratic classifiers can be used and they are within the scope of the current invention.

V. Prediction Guided Learning

As shown in FIGS. 1-3, the prediction guided learning inputs the initial classifier 104 that is trained by prediction learning (106, 200 or 300). The prediction guided learning performs update training of the classifier with new label data (108, 202, 302).

To train an entire classifier such as deep network from scratch with random initialization requires a large labeled dataset and is computationally demanding and time consuming. The prediction guided learning starts from initial classifier 104 that is trained by self-supervised prediction learning 102. The prediction guided learning is then trained for the outcomes of interest by a small amount of labeled data through fine-tune learning.

The prediction guided learning can be considered a kind of transfer learning. In one embodiment of the invention, the initial classifier 104 is used as an initialization state for fine-tuning. In the fine-tune learning, the parameters such as the weights of deep network or recurrent network can be updated by continuing the learning with the labeled data. In one embodiment of the invention, the whole classifier is updated. In another embodiment of the invention, the earlier layers of deep network are fixed (due to overfitting concerns) and only higher-level portion of the network is updated by fine-tune learning.

In yet another embodiment of the invention, the initial classifier 104 is used as a fixed feature extractor for new applications. The last layer and/or higher-level portion of the network are removed, then the rest of the initial classifier 104 is treated as a fixed feature extractor, and a traditional machine learning method is trained for the new labeled data. This could be supplemented with conventional features as well.

A. Prediction Guided Semantic Learning

In the prediction guided semantic learning module 106 implemented in the embodiment shown in FIG. 1, the semantic outcomes of interest are not the future data that is predicted in the initial classifier 104. However, the initial classifier 104 trained by prediction learning forms a model representation that captures the intrinsic characteristics and dynamics of the data sequence in deep network. In the case of prediction learning 102 using traditional machine learning methods, the initial classifier 104 extracts the discriminate features from the prediction learning 102 for use in the prediction guided semantic learning 106.

In the case of prediction learning 102 using deep network or recurrent network, the prediction guided semantic learning 106 will use the same deep network or recurrent network. But rather than starting with random weights, the prediction guided semantic learning 106 starts with the parameters from the initial classifier 104. Therefore the prediction guided semantic learning 106 could be trained with a small number of semantic label data 108 and can be trained with fewer iterations and can yield good accuracy for the output classifier 110 and semantic classification 112.

In the case of prediction learning 102 using traditional machine learning methods, the prediction guided semantic learning 106 will use the same traditional machine learning methods. But rather than starting with all features, the prediction guided semantic learning 106 starts with the features extracted from the initial classifier 104. Therefore the prediction guided semantic learning 106 could be trained with a small number of semantic label data 108 with fewer features and can yield good accuracy for the output classifier 110 and semantic classification 112.

B. Prediction Guided Update Learning

In the prediction guided update learning module 200 implemented in the embodiment shown in FIG. 2, the outcomes of interest are in line with or can be derived from the future data that is predicted in the initial classifier 104. Therefore, the prediction guided update learning 200 is simply a continued learning with explicit labeled data for fine-tune learning.

In the case of prediction learning 102 using deep network or recurrent network, the prediction guided update learning 200 will continue to use the same deep network or recurrent network. It will start with the parameters from the initial classifier 104 with additional training by a small number of label data 202 and can be trained with fewer iterations and can yield good accuracy for the output classifier 110 and data classification 204, targeted at the intended data. In the case of prediction learning 102 using traditional machine learning methods, the prediction guided update learning 200 uses the same traditional machine learning methods. It starts with the features extracted from the initial classifier 104 with additional training by a small number of label data 202 and can be trained with fewer features yet can yield good accuracy for the output classifier 110 and data classification 204, targeted at the intended data.

C. Prediction Guided Update and Semantic Learning

In the prediction guided update and semantic learning module 300 implemented in the embodiment shown in FIG. 3, the output classifier 110 can perform both semantic classification 112 and data classification 204. In the case of prediction learning 102 using deep network or recurrent network, the prediction guided update and semantic learning 300 uses the same deep network or recurrent network. But rather than starting with random weights, the combined semantic and data learning starts with the parameters of the initial classifier 104. Therefore the prediction guided update and semantic learning 300 could be trained with a small number of semantic and label data 302. It can be trained with fewer iterations and can yield good accuracy for the output classifier 110 and both semantic classification 112 and data classification 204.

In the case of prediction learning 102 using traditional machine learning methods, the prediction guided update and semantic learning 300 uses the same traditional machine learning methods. But rather than starting with all features, the prediction guided update and semantic learning 300 starts with the features extracted from the initial classifier 104. Therefore the prediction guided update and semantic learning 300 could be trained with a small number of semantic and label data 302. It can be trained with fewer features yet yield good accuracy for the output classifier 110 and both semantic classification 112 and data classification 204.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized prediction guided learning method for classification of sequential time-lapse image data, comprising the steps of:
    a) inputting a time-lapse image data sequence into a computer memory of a computer hosting a computerized machine learning, wherein the time-lapse image data sequence is delayed by delay buffering the time-lapse image data sequence for a pre-determined period of time to generate a delayed time-lapse image data sequence;
    b) performing by a computer program of the computerized machine learning a prediction learning using the time-lapse image data sequence as truth data directly for prediction by the delayed time-lapse image data sequence without explicit labeling data to generate an initial machine learning classifier, wherein the prediction learning is performed by a self-supervised prediction learning to train the initial machine learning classifier using the delayed time-lapse image data sequence as input to predict the time-lapse image data sequence which is effectively the pre-determined period of time ahead of the delayed time-lapse image data sequence;
    c) inputting semantic label data into the computer memory; and
    d) performing by a computer program of the computerized machine learning a prediction guided semantic learning using the time-lapse image data sequence, the initial machine learning classifier containing learned feature representation and the semantic label data to generate an output machine learning classifier and applying the output machine learning classifier to the time-lapse image data sequence to generate a semantic classification, wherein the semantic classification labels pixels of the time-lapse image data sequence, and wherein the feature representation is fixed in the initial classifier.

2. The computerized prediction guided learning method of claim 1, wherein the prediction guided semantic learning is selected from a group consisting of deep network, recurrent network, and traditional machine learning methods.

3. The computerized prediction guided learning method of claim 1, wherein the self-supervised prediction learning comprises a deep network.

4. The computerized prediction guided learning method of claim 1, wherein the self-supervised prediction learning comprises a recurrent network.

5. The computerized prediction guided learning method of claim 1, wherein the self-supervised prediction learning includes a traditional machine learning selected from a group consisting of decision tree classifier, random forest classifier, support vector machine, kernel estimator, mixture of Gaussian classifier, and nearest neighbor classifier.

6. The computerized prediction guided learning method of claim 3, wherein the deep network of the self-supervised prediction learning comprises a fully convolutional network.

7. A computerized prediction guided learning method for classification of sequential time-lapse image data, comprising the steps of:
    a) inputting a time-lapse image data sequence into a computer memory of a computer hosting a computerized machine learning, wherein the time-lapse image data sequence is delayed by delay buffering the time-lapse image data sequence for a pre-determined period of time to generate a delayed time-lapse image data sequence;

b) performing by a computer program of the computerized machine learning a prediction learning using the time-lapse image data sequence as truth data directly without explicit labeling data to generate an initial machine learning classifier, wherein the prediction learning is performed by a self-supervised prediction learning to train the initial machine learning classifier using the delayed time-lapse image data sequence as input to predict the time-lapse image data sequence which is effectively the pre-determined period of time ahead of the delayed time-lapse image data sequence;

c) inputting label data into the computer memory; and d) performing by a computer program of the computerized machine learning a prediction guided update learning using the time-lapse image data sequence, the initial machine learning classifier containing learned feature representation and the label data to generate an output machine learning classifier and applying the output machine learning classifier to the time-lapse image data sequence to generate an image data classification for a targeted classification task, wherein the feature representation is fixed in the initial classifier.

8. The computerized prediction guided learning method of claim 7, wherein the prediction guided update learning is selected from a group consisting of deep network, recurrent network, and traditional machine learning methods.

9. The computerized prediction guided learning method of claim 7, wherein the self-supervised prediction learning comprises a deep network.

10. The computerized prediction guided learning method of claim 7, wherein the self-supervised prediction learning comprises a recurrent network.

11. The computerized prediction guided learning method of claim 7, wherein the self-supervised prediction learning includes a traditional machine learning selected from a group consisting of decision tree classifier, random forest classifier, support vector machine, kernel estimator, mixture of Gaussian classifier, and nearest neighbor classifier.

12. The computerized prediction guided learning method of claim 9, wherein the deep network of the self-supervised prediction learning comprises a fully convolutional network.

13. A computerized prediction guided learning method for classification of sequential time-lapse image data, comprising the steps of:

a) inputting a time-lapse image data sequence into a computer memory of a computer hosting a computerized machine learning, wherein the time-lapse image data sequence is delayed by delay buffering the time-lapse image data sequence for a pre-determined period of time to generate a delayed time-lapse image data sequence;

b) performing by a computer program of the computerized machine learning tool a prediction learning using the time-lapse image data sequence as truth data directly without explicit labeling data to generate an initial machine learning classifier, wherein the prediction learning is performed by a self-supervised prediction learning to train the initial machine learning classifier using the delayed time-lapse image data sequence as input to predict the time-lapse image data sequence which is effectively the pre-determined period of time ahead of the delayed time-lapse image data sequence;

c) inputting semantic and label data into the computer memory; and d) performing by a computer program of the computerized machine learning a prediction guided update and semantic learning using the time-lapse image data sequence, the initial machine learning classifier containing learned feature representation and the semantic and label data to generate an output machine learning classifier, and applying the output machine learning classifier to the time-lapse image data sequence to generate a semantic classification and a data classification for a targeted classification task wherein the semantic classification labels pixels of the time-lapse image data sequence, wherein the feature representation is fixed in the initial classifier.

14. The computerized prediction guided learning method of claim 13, wherein the prediction guided update and semantic learning is selected from a group consisting of deep network, recurrent network, and traditional machine learning methods.

15. The computerized prediction guided learning method of claim 13, wherein the self-supervised prediction learning comprises a deep network.

16. The computerized prediction guided learning method of claim 13, wherein the self-supervised prediction learning comprises a recurrent network.

17. The computerized prediction guided learning method of claim 13, wherein the self-supervised prediction learning includes a traditional machine learning selected from a group consisting of decision tree classifier, random forest classifier, support vector machine, kernel estimator, mixture of Gaussian classifier, and nearest neighbor classifier.

18. An apparatus for computerized prediction guided learning for classification of sequential data, comprising:

a memory for storing a data sequence and semantic and/or label data, wherein the data sequence is delayed for a pre-determined period of time to generate a delayed data sequence;

a computerized machine learning for performing a prediction learning using the data sequence and the delayed data sequence without explicit labeling data to generate an initial machine learning classifier, wherein the prediction learning is performed by a self-supervised prediction learning to train the initial machine learning classifier using the delayed data sequence as input to predict the data sequence which is effectively the pre-determined period of time ahead of the delayed data sequence, and performing a prediction guided semantic learning using the data sequence, the initial machine learning classifier containing learned feature representation and the semantic and/or label data to generate an output machine learning classifier and semantic and/or classification, wherein the feature representation is fixed in the initial classifier, wherein the self-supervised prediction learning is implemented by a deep network or a recurrent network including an input layer, a plurality of hidden layers, and an output layer, wherein in a training phase, the data sequence is processed in a feedback way by the output layer, and then by the plurality of hidden layers, and then by the input layer to update parameters, and in a classification phase, the delayed data sequence is processed in a feed-forward way by the input layer, and then by the plurality of hidden layers, and then by the output layer to generate the initial machine learning classifier.

19. The computerized prediction guided learning method of claim 18, wherein the deep network of the self-supervised prediction learning comprises a fully convolutional network.

* * * * *